(12) United States Patent
Tosaka

(10) Patent No.: US 9,994,230 B2
(45) Date of Patent: Jun. 12, 2018

(54) INFORMATION PROCESSING APPARATUS, INFORMATION PROCESSING METHOD, AND COMPUTER PROGRAM

(71) Applicant: Ryoh Tosaka, Kanagawa (JP)

(72) Inventor: Ryoh Tosaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days. days.

(21) Appl. No.: 15/452,808

(22) Filed: Mar. 8, 2017

(65) Prior Publication Data

US 2017/0174225 A1 Jun. 22, 2017

Related U.S. Application Data

(63) Continuation of application No. 14/814,817, filed on Jul. 31, 2015, now Pat. No. 9,623,873.

(30) Foreign Application Priority Data

Aug. 8, 2014 (JP) .................................. 2014-162926
Jun. 18, 2015 (JP) .................................. 2015-123138

(51) Int. Cl.
*B60W 50/00* (2006.01)
*B60W 40/04* (2006.01)
(Continued)

(52) U.S. Cl.
CPC ........ *B60W 50/0097* (2013.01); *B60W 10/04* (2013.01); *B60W 10/30* (2013.01); *B60W 30/18027* (2013.01); *B60W 40/04* (2013.01); *B60W 2400/00* (2013.01); *B60W 2550/22* (2013.01); *B60W 2710/30* (2013.01)

(58) Field of Classification Search
CPC ....... B60W 50/0097; B60W 30/18027; B60W 40/04; B60W 10/30; B60W 10/04; B60W 2710/30; B60W 2400/00; B60W 2550/22
See application file for complete search history.

(56) References Cited

U.S. PATENT DOCUMENTS 9,069,653 B2  6/2015 Be et al.
9,623,873 B2 * 4/2017 Tosaka .............. B60W 30/1886
(Continued)

FOREIGN PATENT DOCUMENTS

DE  10 2013 104 533 A1  11/2013
EP     2 781 722 A1      9/2014

*Primary Examiner* — Frederick M Brushaber
(74) *Attorney, Agent, or Firm* — Oblon, McClelland, Maier & Neustadt, L.L.P.

(57) ABSTRACT

An information processing apparatus is mounted on a vehicle. The information processing apparatus includes: a first acquiring unit that acquires, from each of one or more traffic lights, traffic light information including identifying information for identifying a corresponding traffic light, position information of the corresponding traffic light, and start time and end time of lighting in a color of a traffic signal indicating stop of the vehicle; a calculation unit that calculates a signal waiting time that indicates a time period for the vehicle to stop at a traffic light by using one or more pieces of the traffic light information; and an electric power control unit that controls an electric power state during stop of the vehicle in a multistage manner in accordance with the signal waiting time.

17 Claims, 11 Drawing Sheets

(51) Int. Cl.
*B60W 10/30* (2006.01)
*B60W 30/18* (2012.01)
*B60W 10/04* (2006.01)

(56) References Cited

U.S. PATENT DOCUMENTS

| | | | |
|---|---|---|---|
| 2007/0202991 A1* | 8/2007 | Matsumura | F16D 28/00 477/174 |
| 2009/0029675 A1* | 1/2009 | Steinmetz | H04K 3/415 455/410 |
| 2009/0279839 A1* | 11/2009 | Nakamura | G11B 20/10 386/248 |
| 2009/0299549 A1* | 12/2009 | Albertson | B60W 10/06 701/2 |
| 2010/0070128 A1 | 3/2010 | Johnson | |
| 2011/0199235 A1* | 8/2011 | John | G08G 1/14 340/932.2 |
| 2012/0038490 A1* | 2/2012 | Verfuerth | H05B 37/0272 340/910 |
| 2012/0146814 A1* | 6/2012 | Kim | G08G 1/096783 340/929 |
| 2012/0252350 A1* | 10/2012 | Steinmetz | H04K 3/415 455/1 |
| 2013/0061580 A1* | 3/2013 | Satou | B01D 53/944 60/295 |
| 2013/0068107 A1* | 3/2013 | Haseyama | B01D 46/42 96/425 |
| 2013/0285840 A1* | 10/2013 | Allen | G08G 1/07 340/923 |
| 2014/0046581 A1* | 2/2014 | Ota | G08G 1/096716 701/408 |
| 2014/0098230 A1* | 4/2014 | Baur | B60R 16/0232 348/148 |
| 2014/0335994 A1 | 11/2014 | Otake | |
| 2016/0039420 A1* | 2/2016 | Tosaka | B60W 30/1886 701/36 |

* cited by examiner

INFORMATION PROCESSING APPARATUS, INFORMATION PROCESSING METHOD, AND COMPUTER PROGRAM

CROSS-REFERENCE TO RELATED APPLICATIONS

The present application is a continuation application of U.S. application Ser. No. 14/814,817, filed Jul. 31, 2015, which claims priority to Japanese Patent Application No. 2014-162926 filed in Japan on Aug. 8, 2014 and Japanese Patent Application No. 2015-123138 filed in Japan on Jun. 18, 2015. The entire contents of the above-identified applications are incorporated herein by reference.

BACKGROUND OF THE INVENTION

1. Field of the Invention

The present invention relates to an information processing apparatus, an information processing method, and a computer program product.

2. Description of the Related Art

Some energy saving systems can be provided to a vehicle (including onboard equipment) stopping at the red signal. For example, Japanese Patent Application Laid-open No. 2012-3351 discloses a conventional technology with which a vehicle receives packets including information related to a duration time of lighting. If the color of the light indicates red and if the value of the duration time of lighting is larger than a threshold, control is performed to stop the engine.

However, in conventional technologies, no system has been provided that controls the electric power state of the vehicle in a multistage manner in accordance with a time period during which the vehicle stops at the traffic light (hereinafter also referred to as "signal waiting time").

SUMMARY OF THE INVENTION

It is an object of the present invention to at least partially solve the problems in the conventional technology.

An information processing apparatus is mounted on a vehicle. The information processing apparatus includes: a first acquiring unit that acquires, from each of one or more traffic lights, traffic light information including identifying information for identifying a corresponding traffic light, position information of the corresponding traffic light, and start time and end time of lighting in a color of a traffic signal indicating stop of the vehicle; a calculation unit that calculates a signal waiting time that indicates a time period for the vehicle to stop at a traffic light by using one or more pieces of the traffic light information; and an electric power control unit that controls an electric power state during stop of the vehicle in a multistage manner in accordance with the signal waiting time.

An information processing method is executed by an information processing apparatus mounted on a vehicle. The information processing method includes: first acquiring, from each of one or more traffic lights, traffic light information including identifying information for identifying a corresponding traffic light, position information of the corresponding traffic light, and start time and end time of lighting in a color of a traffic signal indicating stop of the vehicle; calculating a signal waiting time that indicates a time period for the vehicle to stop at the traffic light by using one or more pieces of the traffic light information; and controlling an electric power state during stop of the vehicle in a multistage manner in accordance with the signal waiting time.

A computer program product includes a non-transitory computer-readable medium containing an information processing program. The program causes a computer mounted on a vehicle to execute: first acquiring, from one or more traffic lights, traffic light information including identifying information for identifying the traffic lights, position information of the traffic lights, and start times and end times of lighting in a color of a traffic signal indicating stop of the vehicle; calculating a signal waiting time that indicates a time period for the vehicle to stop at the traffic light by using one or more pieces of the traffic light information; and controlling an electric power state during stop of the vehicle in a multistage manner in accordance with the signal waiting time.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an information processing apparatus, an information processing method, and a computer program product according to some embodiments of the present invention will be described in detail with reference to accompanying drawings. Hereinafter, "vehicle" refers to an object capable of running on a road, including cars and motorbikes. Examples of vehicles include a diesel vehicle, a fuel cell electric vehicle, a hybrid vehicle, and an electric vehicle.

First Embodiment

Figure 1:
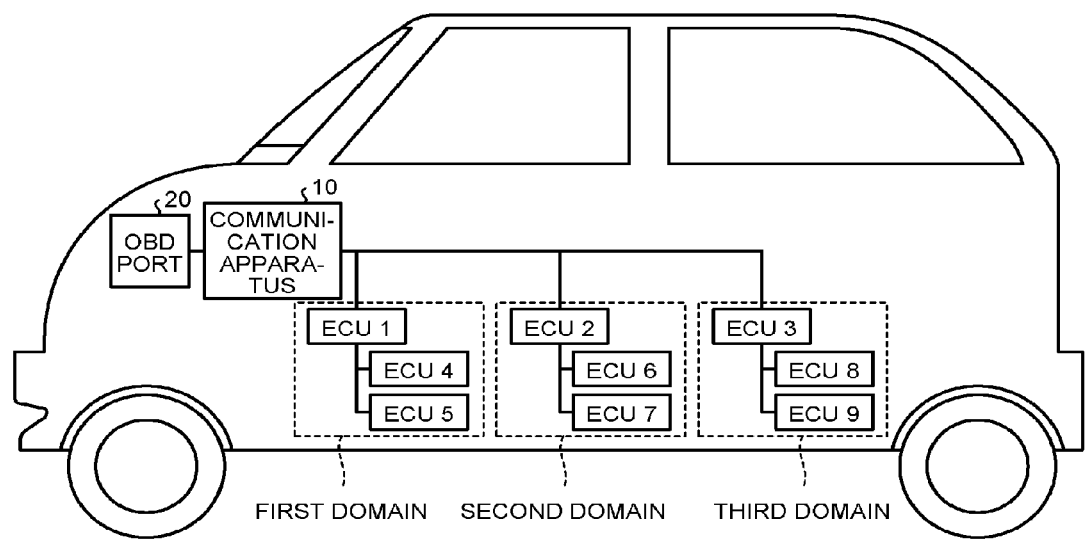
FIG. 1 is a diagram illustrating an example of the configuration of an electronic control unit (ECU) in a vehicle.

FIG. 1 is a diagram illustrating an example of the configuration of an electronic control unit (ECU) in a vehicle according to a first embodiment of the present invention. The example illustrated in FIG. 1 includes a plurality of (three in the example illustrated in FIG. 1) domains (control systems), each including a plurality of ECUs (1, 2, and 3). Each of the domains integrally controls a plurality of ECUs belonging to the corresponding domain and is coupled to a communication apparatus 10 externally communicating with a device and the like. The example illustrated in FIG. 1 includes three domains, out of which a first domain includes an ECU 1, an ECU 4, and an ECU 5. The ECU 1 integrally controls the ECU 4 and the ECU 5 and is coupled to the communication apparatus 10. A second domain includes an ECU 2, an ECU 6, and an ECU 7. The ECU 2 integrally controls the ECU 6 and the ECU 7 and is coupled to the communication apparatus 10. A third domain includes an ECU 3, an ECU 8, and an ECU 9. The ECU 3 integrally controls the ECU 8 and the ECU 9 and is coupled to the communication apparatus 10.

While FIG. 1 illustrates the three domains, the number and types of domains may be changed optionally. Examples of the domains include an infotainment system (a control system including an audio visual system, a car navigation, and an electronic toll collection (ETC) system, for example), a body system (a control system including meters, a vehicle air-conditioner, and windows, for example), a power train system (a control system including an engine and a transmission, for example), and a chassis system (a control system including a brake, a steering, and a collision avoidance mechanism, for example).

An on-board diagnostics system (OBD) notifies a driver of a fault point in the vehicle. Examples of OBD types include, but are not limited to, OBD-I and OBD-II, out of which OBD-II is adopted in this example. An OBD port 20 illustrated in FIG. 1 is an interface for coupling the system (OBD) and the communication apparatus 10 to each other. The configuration of the ECU in the vehicle is not limited to the configuration illustrated in FIG. 1, and other various ECU configurations may be adopted. The domains each may include a communication apparatus, for example. Alternatively, an ECU configuration in a vehicle may be included in an advanced driver assistance system (ADAS), for example.

Figure 2:
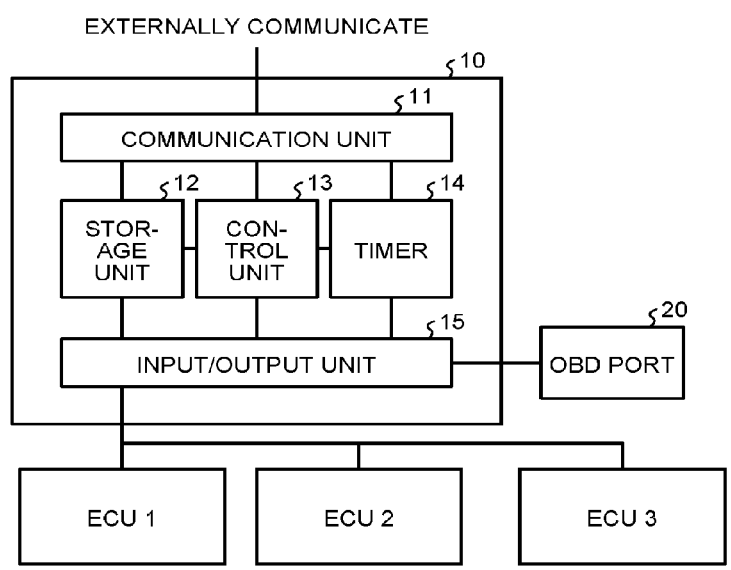
FIG. 2 is a diagram illustrating an example of the configuration of a communication apparatus.

FIG. 2 is a diagram illustrating an example of the configuration of the communication apparatus 10. As illustrated in FIG. 2, the communication apparatus 10 includes a communication unit 11, a storage unit 12, a control unit 13, a timer 14, and an input/output unit 15. The communication unit 11 communicates with an external device outside of the vehicle (e.g., a later-described traffic light 30, intelligent transport systems (ITS), or other external systems). The storage unit 12 stores various types of information such as information required for transmitting and receiving packets. The control unit 13 integrally controls entire operations of the communication apparatus 10 and is constituted by a CPU in this example. The timer 14 measures time. The input/output unit 15 exchanges information in the vehicle. The communication unit 11, the control unit 13, and the timer 14 may be implemented with software or hardware. In hardware implementation, the CPU executing software processing during communication processing can execute other processing. If no processing is required, the CPU can shift to the energy saving mode. The storage unit 12 may be a USB memory, an SD memory, a RAM, and the like, as long as they can store packets therein. The storage unit 12 needs to include a reading function and a writing function.

Figure 3:
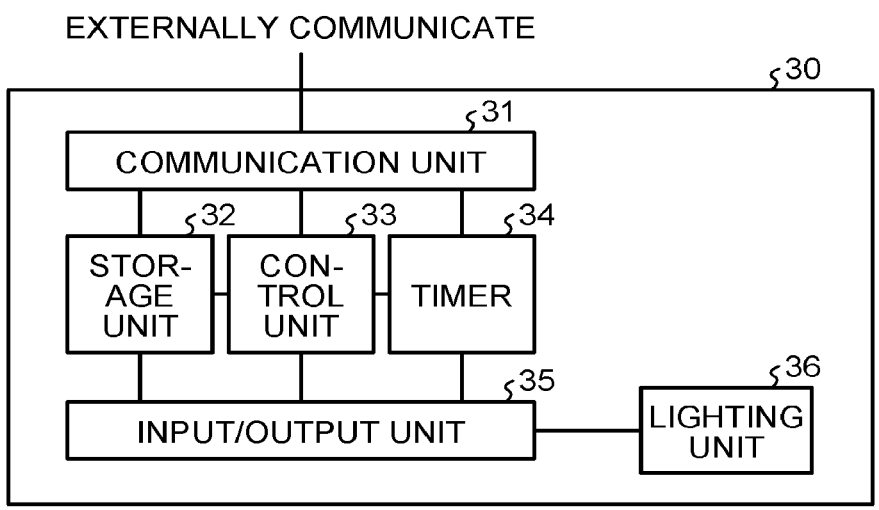
FIG. 3 is a diagram illustrating an example of the configuration of a traffic light.

FIG. 3 is a diagram illustrating an example of the configuration of a traffic light 30 installed on a road. As illustrated in FIG. 3, the traffic light 30 includes a communication unit 31, a storage unit 32, a control unit 33, a timer 34, an input/output unit 35, and a lighting unit 36. The communication unit 31 communicates with an external device out of the traffic light 30 (e.g., the communication apparatus 10 of the vehicle). The storage unit 32 stores therein various types of information such as information required for transmitting and receiving packets. The control unit 33 integrally controls entire operations of the traffic light 30 and is constituted by a CPU in this example. The timer 34 measures time. The input/output unit 35 exchanges information in the traffic light 30 and functions as a unit for coupling the control unit 33 to the lighting unit 36, for example. The lighting unit 36 lights up traffic signals such as a red signal indicating stop of the vehicle and the green signal permitting advance of the vehicle. The communication unit 31, the control unit 33, and the timer 34 may be implemented with software or hardware. In hardware implementation, the CPU executing software processing during communication processing can execute other processing. If no processing is required, the CPU can shift to the energy saving mode. The storage unit 32 may be a USB memory, an SD memory, a RAM, and the like, as long as they can store packets therein. The storage unit 32 needs to include a reading function and a writing function.

In the present embodiment, the traffic light 30 periodically broadcasts packets including information of the traffic light 30 (traffic light information). The traffic light information includes at least an IP address, position information of the traffic light 30, and start time and end time of lighting in a color of the traffic signal indicating stop of the vehicle (red in this example). The IP address may be global IPv4 or IPv6 and is used for identifying the individual traffic light 30. The start time of lighting in the color of the traffic signal indicating stop of the vehicle may be hereinafter referred to as "start time of the red signal". The end time of lighting in the color of the traffic signal indicating stop of the vehicle may be hereinafter referred to as "end time of the red signal". In this example, the IP address can be considered to correspond to "identifying information" in claims herein, but is not limited thereto. If the traffic light 30 indicates the red signal, the broadcast packets include the start time and the end time of the present red signal. If the traffic light 30 indicates the green signal, the broadcast packets include the start time and the end time of the next red signal. The control unit 33 of the traffic light 30 monitors the timer 34 and generates packets to be broadcast at regular intervals (the value of the interval may be set in a register in the control unit 33). The control unit 33 then stores the generated packets in the storage unit 32. Subsequently, the control unit 33 passes a head address in a queue in a storage area in the storage unit 32 as the minimum information to the communication unit 31. The communication unit 31 broadcasts the packets to the outside of the traffic light 30. The configuration and operation for passing the head address in a queue are not necessarily limited to those described above.

The above-described "color indicating stop of the vehicle" typically refers to the color indicating stop of the straight running of the vehicle.

Figure 4:
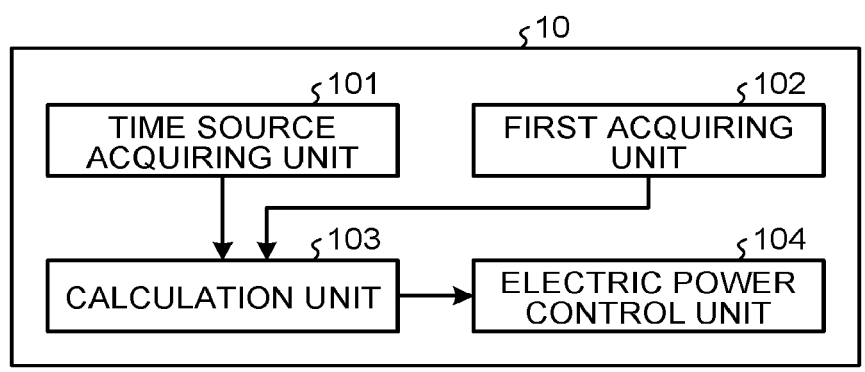
FIG. 4 is a diagram illustrating an example of the functional configuration of the communication apparatus.

FIG. 4 is a diagram illustrating an example of the functional configuration of the communication apparatus 10. Although FIG. 4 mainly illustrates the functions according to the embodiments of the present invention for convenience of description, the communication apparatus 10 may include other functions. As illustrated in FIG. 4, the communication apparatus 10 includes a time source acquiring unit 101, a first acquiring unit 102, a calculation unit 103, and an electric power control unit 104. These functions and units are achieved with any one of the components illustrated in FIG. 2 operating by a command from the CPU of the communication apparatus 10. In this example, the communication apparatus 10 can be considered to correspond to an "information processing apparatus" in claims herein, but is not limited thereto. The whole configuration of the ECU of the vehicle (the whole configuration illustrated in FIG. 1) can also be considered to correspond to the "information processing apparatus" in claims herein. In short, any configuration is acceptable, as long as the information processing apparatus including at least the functions illustrated in FIG. 4 are mounted on a vehicle.

The time source acquiring unit 101 acquires time source. The time source can be acquired from a global positioning system (GPS) satellite or a code division multiple access (CDMA) mobile-phone base station. The traffic light 30 also acquires time source in the same manner, thereby synchronizing time between the traffic light 30 and the vehicle.

The first acquiring unit 102 acquires, from one or more traffic lights 30, traffic light information including IP addresses for identifying the traffic lights 30, position information of the traffic lights 30, and start times and end times of the red signal. In the present embodiment, the first acquiring unit 102 receives (acquires), from one or more traffic lights 30, the above-described packets to be periodically broadcast.

The calculation unit 103 calculates the signal waiting time that indicates a time period for the own vehicle to stop at the traffic light 30 by using one or more pieces of the traffic light information acquired by the first acquiring unit 102. More specifically, the calculation unit 103 calculates the signal waiting time by using predicted time of arrival and the traffic light information acquired from the nearest traffic light. The predicted time of arrival indicates predicted time for the own vehicle to arrive at the nearest traffic light. In addition, the calculation unit 103 identifies the nearest traffic light 30 existing in the advance direction of the own vehicle based on navigation information indicating the position information of a plurality of traffic lights 30 and the respective IP addresses, and the advance direction of the own vehicle. The calculation unit 103 then calculates the signal waiting time by using the traffic light information including the IP address of the identified traffic light 30 out of the one or more pieces of the traffic light information acquired by the first acquiring unit 101. The navigation information typically indicates the position of the own vehicle on geographic information prepared in advance. In this example, the navigation information also includes the IP addresses of the traffic lights 30 existing on the geographic information.

As illustrated in FIG. 2, the communication unit 11 of the communication apparatus 10 receives packets broadcast from the traffic light 30 and stores them in the storage unit 12. The communication unit 11 passes the head address in a queue in the storage area in the storage unit 12 as the minimum information to the control unit 13. The control unit 13 transfers the source IP address of the broadcast packets to the ECU controlling the car navigation. The configuration and operation for passing the head address in a queue are not necessarily limited thereto. The ECU controlling the car navigation compares the IP address of the traffic light 30 in the navigation information stored in advance in the ECU with the source IP address of the broadcast packets. The ECU controlling the car navigation thus can identify the traffic light 30 from which the packets are transmitted. For example, the control unit 13 may transfer the position information of the traffic light 30 in the traffic light information included in the broadcast packets to the ECU controlling the car navigation. On this occasion, the ECU controlling the car navigation compares the position information of the traffic light 30 in the navigation information stored in advance in the ECU with the position information transferred from the control unit 13. The ECU controlling the car navigation thus can identify the traffic light 30 corresponding to the position information transferred from the control unit 13. Subsequently, the ECU controlling the car navigation identifies, under the instruction of the control unit 13, the nearest traffic light 30 existing in the advance direction of the own vehicle out of the one or more traffic lights 30 that each have broadcast packets. The ECU controlling the car navigation then uses the packets from the identified traffic light 30 (hereinafter also referred to as "targeted traffic light 30") to calculate the above-described signal waiting time. While the ECU controlling the car navigation can identify (estimate) the advance direction of the own vehicle based on the route to the destination and the present position of the own vehicle, for example, the method for identifying the advance direction of the own vehicle is optional and not limited thereto.

Figure 5:
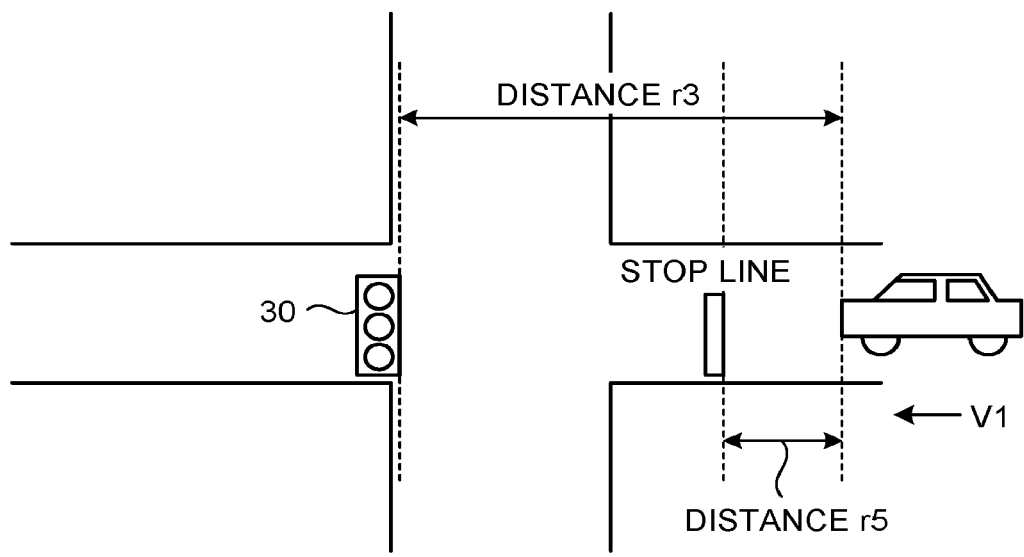
FIG. 5 is a diagram for explaining an example of a calculation method of a signal waiting time.

As described above, the packets transmitted from the targeted traffic light 30 include the IP address of the targeted traffic light 30, the position information of the targeted traffic light 30, the start time and the end time of the red signal. The ECU controlling the car navigation can calculate the signal waiting time by using these pieces of information. As illustrated in FIG. 5, the distance from the present position of the own vehicle to the stop line of the targeted traffic light 30 is determined as r5, the speed of the own vehicle is determined as v1, the start time of the red signal is determined as t1, the end time of the red signal is determined as t2, and the present time is determined as t3, for example. The distance r5 can be calculated by using the above-described navigation information, for example. The speed v1 may be detected by the ECU controlling the car navigation or acquired from another ECU. On this occasion, the predicted time for the own vehicle to arrive at the targeted traffic light 30 (hereinafter also referred to as "predicted time of arrival") is calculated as t3+r5/v1=t4. If the predicted time of arrival t4 is later than the start time t1 of the red signal and earlier than the end time t2 of the red signal (t1<t4<t2), the own vehicle can be determined to stop at the targeted traffic light 30. The signal waiting time is calculated as t2−t4.

If the predicted time of arrival t4 is earlier than the start time t1 of the red signal, the own vehicle is determined not to stop at (to pass through) the targeted traffic light 30. However, even if the predicted time of arrival t4 is earlier than the start time t1 of the red signal, if the time difference between the predicted time of arrival t4 and the start time t1 of the red signal is equal to or smaller than a threshold, the own vehicle may be determined to stop at the targeted traffic light 30. On this occasion, the signal waiting time is calculated as t2−t4. The above-described threshold may be variably set depending on information indicating the congestion on the road, for example. If the own vehicle does not stop at the targeted traffic light 30, no signal waiting time occurs; therefore, the signal waiting time is not calculated.

As described above, in the present embodiment, the ECU controlling the car navigation can determine whether the own vehicle stops at the nearest traffic light 30 and also calculate the signal waiting time by using the traffic light information (e.g., an IP address) included in the packets transmitted from the targeted traffic light 30 and the predicted time of arrival t4. The predicted time of arrival t4 may be calculated by the ECU controlling the car navigation, or may be calculated by another ECU, from which the ECU controlling the car navigation receives the calculation result. The calculation method of the predicted time of arrival t4 is optional and not limited to the above-described method. For example, the predicted time of arrival t4 may be calculated by taking into account the distance r3 from the vehicle (own vehicle) to the targeted traffic light 30 illustrated in FIG. 5. In addition, the predicted time of arrival t4 may be calculated by taking into account the information indicating the congestion on the road that can be acquired from the ITS or other external systems. The ECU controlling the car navigation notifies the control unit 13 of the signal waiting time calculated as described above.

In this example, the control unit 13 (the calculation unit 103) instructs the ECU controlling the car navigation to calculate the signal waiting time and receives the result. This configuration and operation are also included in the concept that "the calculation unit 103 calculates the signal waiting time that indicates a time period for the vehicle to stop at the traffic light 30 by using one or more pieces of the traffic light information acquired by the first acquiring unit 102". In addition, the control unit 13 (the calculation unit 103) may receive the information required for calculating the signal waiting time (e.g., the above-described navigation information) from the ECU controlling the car navigation and calculate the signal waiting time based on the received information, for example.

Description will be continued with reference to FIG. 4 again. The electric power control unit 104 controls the electric power state of the own vehicle during stop of the own vehicle in a multistage manner in accordance with the signal waiting time calculated by the calculation unit 103. More specifically, the electric power control unit 104 performs control so that the power consumption during stop of the own vehicle decreases with an increase in the signal waiting time. For example, if the signal waiting time exceeds a first threshold and is equal to or smaller than a second threshold that is larger than the first threshold, the electric power control unit 104 controls the idling speed of the engine to the speed lower than the idling speed of when the signal waiting time equal to or smaller than the first threshold. If the signal waiting time exceeds the second threshold, the electric power control unit 104 can control the engine to stop. In addition, for example, the electric power control unit 104 can perform control so that the amount of light of an illumination device provided to the own vehicle (typically a headlight) decreases with an increase in the signal waiting time.

Here, the electric power state during stop of the own vehicle is the energy saving state (hereinafter also referred to as "energy saving mode") with smaller power consumption than the normal state (hereinafter also referred to as "normal mode") indicating the electric power state while the own vehicle is running. If no other vehicle exists between the nearest traffic light 30 (the targeted traffic light 30) and the own vehicle during stop of the own vehicle, the electric power control unit 104 performs control so as to cancel the energy saving state a prescribed time period before the end of the signal waiting time. The prescribed time period preferably indicates a time period required for the own vehicle to return from the energy saving state to the normal state.

Figure 6A:
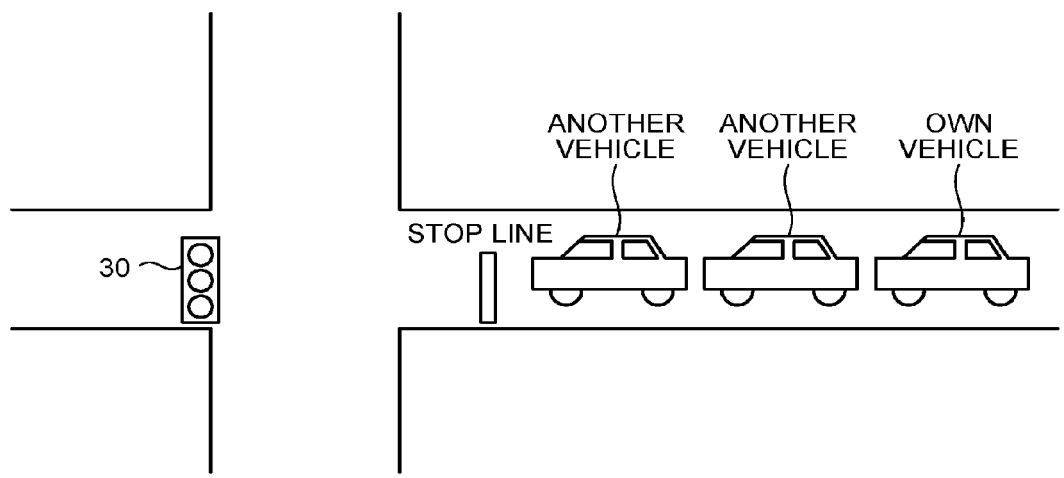
FIGS. 6A and 6B are diagrams for explaining a changing method of a prescribed time period.
Figure 6B:
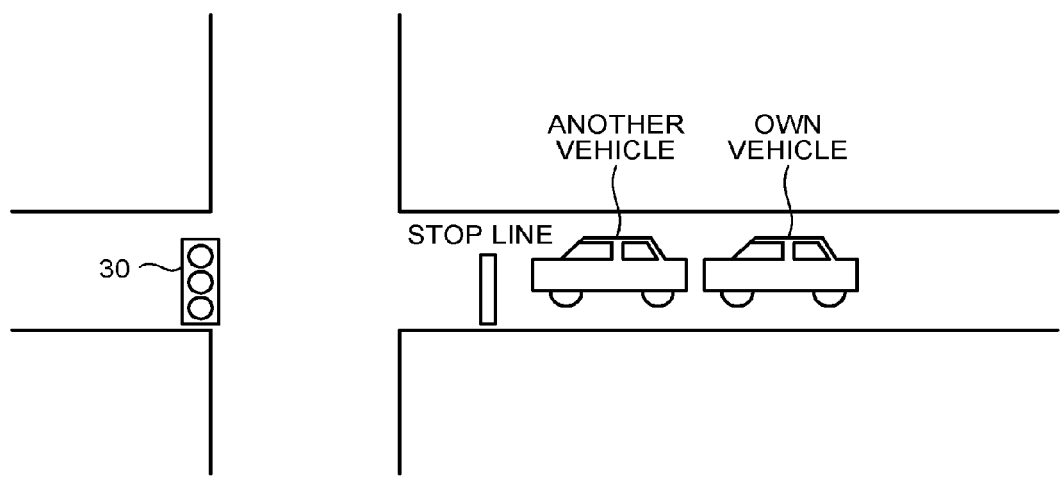

In the present embodiment, if any other vehicle exists between the nearest traffic light 30 and the own vehicle during stop of the own vehicle, the electric power control unit 104 changes the prescribed time period depending on the number of other vehicles. More specifically, if any other vehicle exists between the nearest traffic light 30 and the own vehicle during stop of the own vehicle, the electric power control unit 104 changes the prescribed time period so that the time period decreases with an increase in the number of other vehicles. For example, in FIG. 6A, during stop of the own vehicle, the number of other vehicles existing between the nearest traffic light 30 and the own vehicle is "2". In FIG. 6B, during stop of the own vehicle, the number of other vehicles existing between the nearest traffic light 30 and the own vehicle is "1". On this occasion, the prescribed time period in FIG. 6A is set to a value smaller than that of the prescribed time period in FIG. 6B. Furthermore, the electric power control unit 104 may perform control so as to cancel the energy saving state a prescribed time period after the end of the signal waiting time depending on the number of other vehicles existing between the nearest traffic light 30 and the own vehicle. Increased number of other vehicles existing between the nearest traffic light 30 and the own vehicle delays the start of running the own vehicle. Taking this into account, the control to cancel the energy saving state is delayed, thereby acquiring more advantageous effects of energy saving.

The method for determining whether any other vehicle exists between the nearest traffic light 30 and the own vehicle is optional. For example, the communication apparatus 10 acquires, from another vehicle, vehicle position information indicating the position of the other vehicle (acquires in a certain cycle, for example). Based on the acquired vehicle position information and the above-described navigation information, the communication apparatus 10 can determine whether any other vehicle exists between the nearest traffic light 30 and the own vehicle. If any other vehicle exists between the nearest traffic light 30 and the own vehicle, the communication apparatus 10 can detect the number of other vehicles.

Figure 7:
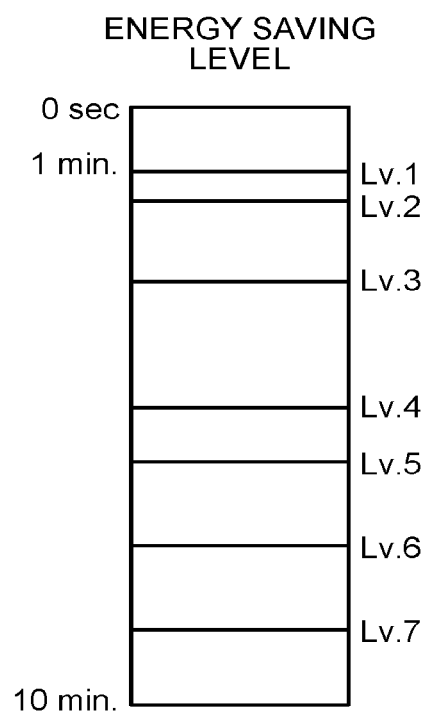
FIG. 7 is a diagram for explaining that an electric power control unit selects the energy saving level during stop of the vehicle in accordance with the signal waiting time.

FIG. 7 is a diagram for explaining that the electric power control unit 104 selects the energy saving level during stop of the own vehicle in accordance with the signal waiting time calculated by the calculation unit 103. The ordinate axis on the left side in FIG. 7 represents the signal waiting time (in the example illustrated in FIG. 7, ranging from 0 to 10 minutes). The ordinate axis on the right side in FIG. 7 represents the energy saving level depending on the signal waiting time. While the correspondence information (the correspondence table) indicating the corresponding relation between the signal waiting time and the energy saving level is stored in the storage unit 12 illustrated in FIG. 2, for example, the destination of the correspondence information is optional and the information may be stored in an external device, for example. The correspondence information may be set by a car mechanic through the OBD port 20 at the factory shipment or during replacement of devices, for example. Alternatively, the correspondence information is displayed on a display (on the screen of the car navigation, the screen provided on the windshield, or the screen of a terminal installed on the own vehicle), for example. The correspondence information can be variably set through an input operation by a driver to the displayed correspondence information. On this occasion, a command corresponding to the user operation is interpreted by an ECU controlling the display. A control command corresponding to the interpretation result is transferred to an ECU controlling the correspondence information. Subsequently, the ECU controlling the correspondence information rewrites the correspondence information in accordance with the received control command.

In the example illustrated in FIG. 7, the energy saving level "1" is adopted if the signal waiting time ranges from 0 minutes to 1 minute. The level setting may be defined depending on the model of the vehicle or depending on the owner of the vehicle. For example, the energy saving level 1 may be set so as not to shift to the energy saving mode because the signal waiting time is short. For another example, the energy saving level 2 may shift to the energy saving mode in which the idling speed of the engine is controlled so as to be lower than the idling speed in the energy saving level 1 (in this example, the idling speed at the time of normal stop). In addition, the power consumption of ECUs each belonging to the corresponding domain may be variably controlled depending on the energy saving level, for example. For example, the energy saving level 2 may shift to the energy saving mode in which the power consumption of only the ECU4 corresponding to the first domain illustrated in FIG. 1 and belonging to the first domain is controlled so as to be smaller than the power consumption in the normal operation (this may be combined with the above-described energy saving mode in which the idling speed of the engine is controlled so as to be lower than the idling speed in the energy saving level 1). For example, the energy saving level 3 may shift to the energy saving mode in which the power consumption of all the ECUs (1, 4, and 5) corresponding to the first domain illustrated in FIG. 1 and belonging to the first domain is controlled so as to be smaller than the power consumption in the normal operation. The power consumption of any components of the ECU may be changed optionally. For example, the power consumption of the CPU alone may be changed.

As illustrated in FIG. 2, the control unit 13 measures the signal waiting time and then compares it with the correspondence information stored in the storage unit 12 (refer to FIG. 7), thereby determining the energy saving level. When the own vehicle stops at the traffic light 30, the control unit 13 transfers the information to at least one of the ECU 1, the ECU 2, and the ECU 3 illustrated in FIG. 1 in accordance with the determined energy saving level. The ECU that has received the information changes the setting of the register in the ECU itself to the setting corresponding to the determined energy saving level. The stop of the own vehicle at the traffic light 30 can be detected with different methods. Suppose the second domain illustrated in FIG. 1 serves as a power train system. The ECU 6 monitors the number of revolutions of the driving wheel. If the number of revolutions becomes zero, the ECU 6 notifies the control unit 13 in the communication apparatus 10 through the ECU 2 to that effect. This notification triggers the control unit 13 to recognize stop of the own vehicle.

Figure 8:
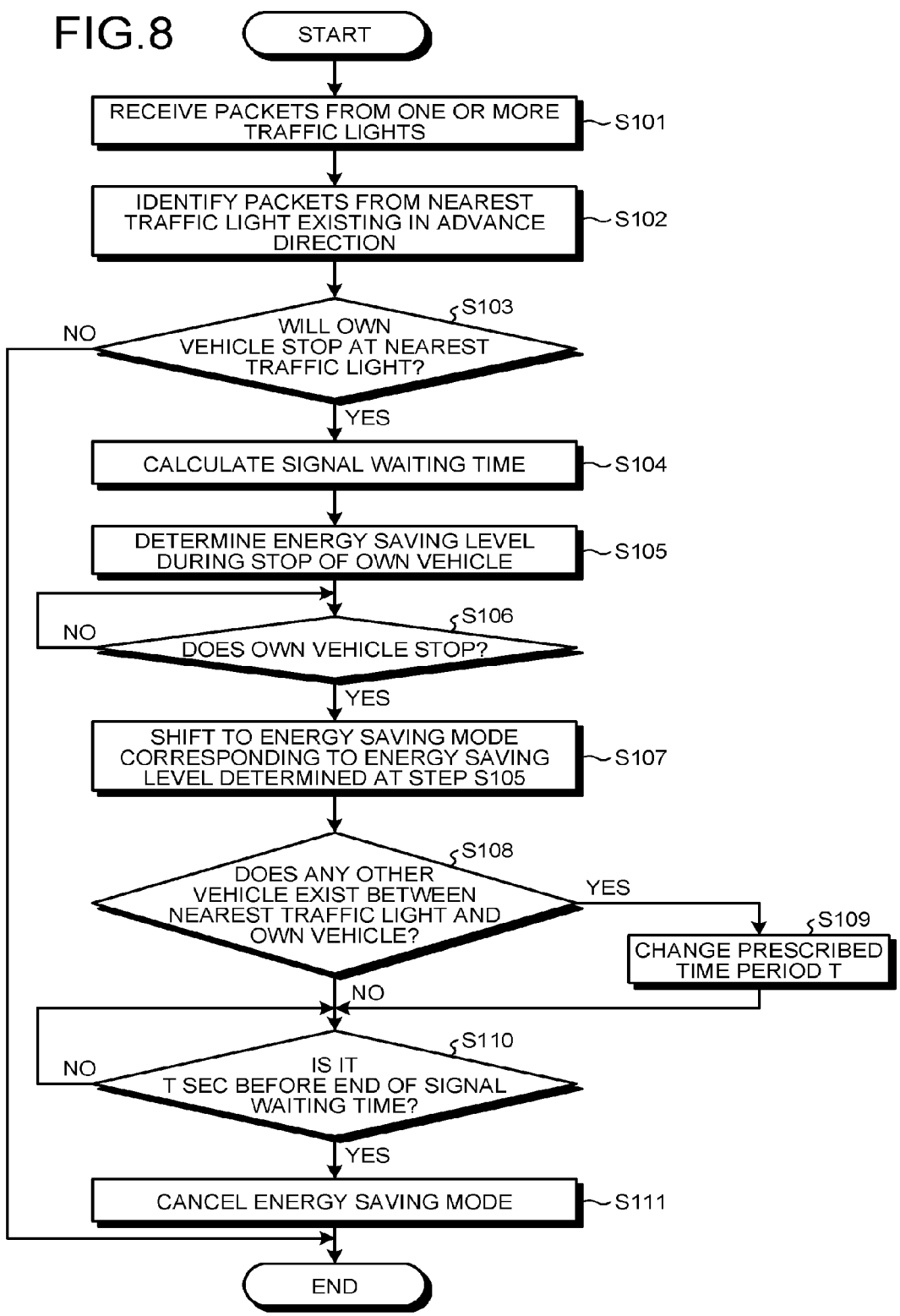
FIG. 8 is a flowchart illustrating an example of operations of a communication apparatus according to a first embodiment of the present invention.

FIG. 8 is a flowchart illustrating an example of operations of the communication apparatus 10 according to the present embodiment. As illustrated in FIG. 8, the first acquiring unit 102 first acquires packets from one or more traffic lights 30 (Step S101). The calculation unit 103 then identifies the packets transmitted from the nearest traffic light 30 existing in the advance direction of the own vehicle out of the one or more groups of packets acquired at Step S101 (Step S102). The identifying method has been described above. In the present embodiment, the calculation unit 103 instructs the ECU controlling the car navigation to identify the packets transmitted from the nearest traffic light 30 and receives the result. Subsequently, the calculation unit 103 determines whether the own vehicle will stop at the nearest traffic light 30 (Step S103). As described above, the calculation unit 103 can also compare the start time and the end time of the red signal included in the packets transmitted from the nearest traffic light 30 with the predicted time for the own vehicle to arrive at the nearest traffic light 30 (the predicted time of arrival), thereby determining whether the own vehicle will stop at the nearest traffic light 30. In the present embodiment, the calculation unit 103 instructs the ECU controlling the car navigation to determine whether the own vehicle stops at the nearest traffic light 30 and receives the result.

If the calculation unit 103 determines that the own vehicle will not stop at the nearest traffic light 30 (No at Step S103), the process sequence ends. By contrast, if the calculation unit 103 determines that the own vehicle will stop at the nearest traffic light 30 (Yes at Step S103), the calculation unit 103 calculates the signal waiting time by using the packets transmitted from the nearest traffic light 30 (Step S104). In the present embodiment, the calculation unit 103 instructs the ECU controlling the car navigation to calculate the signal waiting time and receives the result. The calculation method of the signal waiting time has been described above. For example, the calculation unit 103 can calculate the signal waiting time by using the start time and the end time of the red signal included in the packets transmitted from the nearest traffic light 30, and the predicted time of arrival. Subsequently, the electric power control unit 104 determines the energy saving level during stop of the own vehicle in accordance with the signal waiting time calculated at Step S104 (Step S105). The determining method of the energy saving level has been described above.

If the own vehicle stops (Yes at Step S106), the electric power control unit 104 performs control to shift to the energy saving mode corresponding to the energy saving level determined at Step S105 (Step S107). The electric power control unit 104 then determines whether any other vehicle exists between the nearest traffic light 30 and the own vehicle (Step S108). If the result at Step S108 is positive (Yes at Step S108), the electric power control unit 104 changes a prescribed time period T depending on the number of other vehicles existing between the nearest traffic light 30 and the own vehicle (Step S109). The electric power control unit 104 determines whether it is T second(s) before the end of the signal waiting time (Step S110). By contrast, if the result at Step S108 is negative (No at Step S108), the electric power control unit 104 does not change the prescribed time period T and determines whether it is T second(s) before the end of the signal waiting time (Step S110).

If it is T second(s) before the end of the signal waiting time (Yes at Step S110), the electric power control unit 104 performs control to cancel the energy saving mode (Step S111). As a result, the own vehicle starts running at the timing at which the traffic light 30 changes its light of color to green.

As described above, in the present embodiment, the electric power state during stop of the vehicle is controlled in a multistage manner in accordance with the signal waiting time. The present embodiment therefore can provide advantageous effects that more appropriate energy saving operation can be achieved. The configuration according to the present embodiment is effective in particular for vehicles, such as electric vehicles, that require extremely high energy-saving operation for increased travelable distance.

Modification of the First Embodiment

In the above-described first embodiment, the electric power control unit 104 changes the prescribed time period depending on the number of other vehicles if any other vehicle exists between the nearest traffic light 30 and the own vehicle during stop of the own vehicle. The embodiment is, however, not limited to this. For example, the electric power control unit 104 can also performs control to cancel the energy saving state according to the timing at which, out of other vehicles existing between the nearest traffic light 30 and the own vehicle, another vehicle nearest to the own vehicle (a third vehicle) starts running. For example, the communication apparatus 10 includes a function (a later-described third acquiring unit 106) of acquiring, from the other vehicle, the vehicle position information indicating the position of the other vehicle and stop determination information indicating whether the other vehicle is being stopped. If the stop determination information indicating that the third vehicle is not being stopped (that is, the third vehicle has started running) is acquired from the third vehicle, the electric power control unit 104 may perform control to cancel the energy saving state.

Second Embodiment

A second embodiment will now be described. Overlapped explanation with the description in the first embodiment will be omitted as appropriate. The configuration of the ECUs in the vehicle in the present embodiment is the same as that in the first embodiment. However, in the present embodiment, the electric power control unit 104 further includes a function of controlling the electric power state of the own vehicle during running in accordance with the distance that the own vehicle will travel before the own vehicle stops at the traffic light 30. In the present embodiment, if the own vehicle is determined to stop at the nearest traffic light 30, the calculation unit 103 calculates the distance from the present position of the own vehicle to the stop line of the nearest traffic light 30 as the distance that the own vehicle will travel before the own vehicle stops at the traffic light 30. In this example, the calculation unit 103 instructs the ECU controlling the car navigation to calculate the distance from the present position of the own vehicle to the stop line of the nearest traffic light 30 and receives the result, although the operation is not limited thereto. The calculation unit 103 may receive the information required for calculating the distance (e.g., the above-described navigation information) from the ECU controlling the car navigation, for example, and calculate the distance based on the received information.

Figure 9:
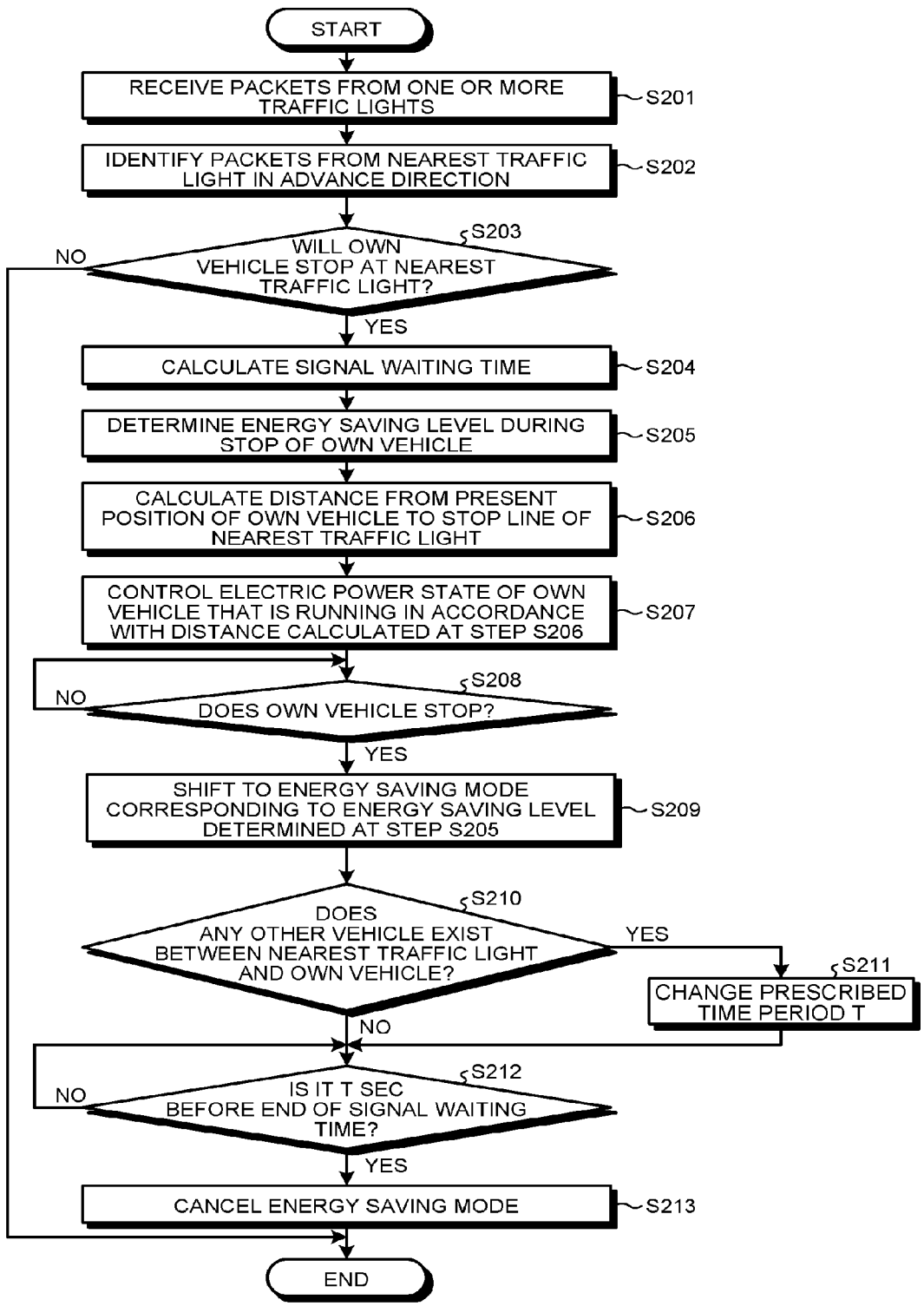
FIG. 9 is a flowchart illustrating an example of operations of a communication apparatus according to a second embodiment of the present invention.

FIG. 9 is a flowchart illustrating an example of operations of the communication apparatus 10 according to the present embodiment. Details of the process from Steps S201 to S205 illustrated in FIG. 9 are the same as those of the process from Steps S101 to S105 illustrated in FIG. 8, and the detailed description thereof is omitted. After Step S205, the calculation unit 103 calculates the distance from the present position of the own vehicle to the stop line of the nearest traffic light 30 (Step S206). As described above, in this example, the calculation unit 103 instructs the ECU controlling the car navigation to calculate the distance from the present position of the own vehicle to the stop line of the nearest traffic light 30. The ECU that has received this instruction calculates the distance from the present position of the own vehicle to the stop line of the nearest traffic light 30 with reference to the navigation information stored in the ECU, for example, and passes the calculation result to the calculation unit 103. Subsequently, the electric power control unit 104 controls the electric power state of the own vehicle that is running in accordance with the distance calculated at Step S206 (Step S207). In this example, the electric power control unit 104 controls the electric power state of the own vehicle that is running to the minimum electric power state allowing the own vehicle to run to the nearest traffic light 30. For example, if the distance calculated at Step S206 is equal to or smaller than the threshold, the electric power control unit 104 can perform control to stop the engine of the own vehicle and let the vehicle run inertially.

Details of the process from Steps S208 to S213 illustrated in FIG. 9 are the same as those of the process from Steps S106 to S109 illustrated in FIG. 8, and the detailed description thereof is omitted.

Modification of the Second Embodiment

Figure 10:
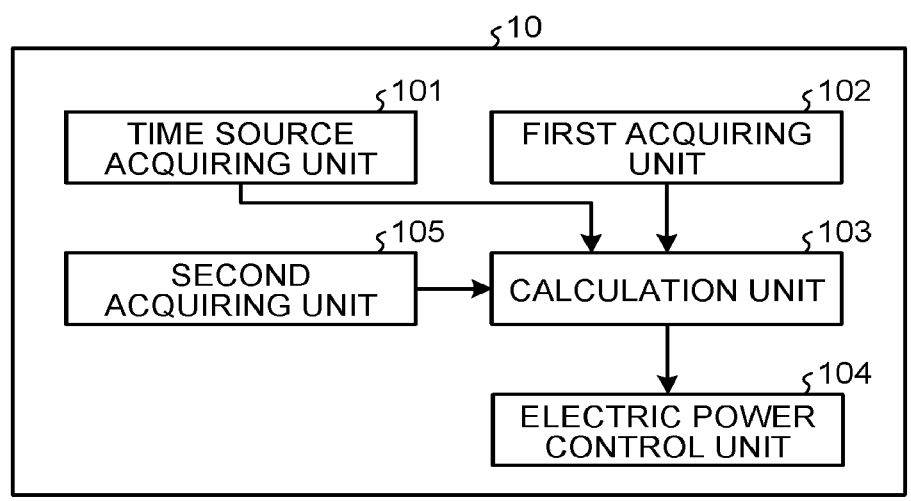
FIG. 10 is a diagram illustrating an example of the functional configuration of a communication apparatus according to a modification of the second embodiment.

FIG. 10 is a diagram illustrating an example of the functional configuration of the communication apparatus 10 according to a modification of the second embodiment. As illustrated in FIG. 10, the communication apparatus 10 further includes a second acquiring unit 105. The second acquiring unit 105 includes a function of acquiring traffic information including predicted time for the own vehicle to arrive at the nearest traffic light 30 (the predicted time of arrival). In this example, the predicted time of arrival is calculated by taking the congestion on the road and the like into account. The second acquiring unit 105 can acquire the traffic information from the ITS or other external systems, for example. The timing at which the second acquiring unit 105 acquires the traffic information is optional, and the second acquiring unit 105 may acquire the traffic information in synchronization with the timing of receiving packets from the traffic light 30.

In this example, the calculation unit 103 determines whether the own vehicle can pass through the nearest traffic light 30 by using one or more pieces of the traffic light information acquired by the first acquiring unit 102 and the traffic information acquired by the second acquiring unit 105. For example, the calculation unit 103 can also determine whether the own vehicle can pass through the nearest traffic light 30 by using the start time and the end time of the red signal included in the packets transmitted from the nearest traffic light 30, and the predicted time of arrive included in the traffic information. For example, if the predicted time of arrival is later than the start time of the red signal and earlier than the end time of the red signal, the calculation unit 103 may determine that the own vehicle cannot pass through the nearest traffic light 30. The method for determining whether the own vehicle can pass through the nearest traffic light 30 is not limited to the above-described method, and different methods can be employed. In this example, the calculation unit 103 instructs the ECU controlling the car navigation to determine whether the own vehicle can pass through the nearest traffic light 30 (from a different viewpoint, whether the own vehicle will stop at the nearest traffic light 30) and receives the result, although the operation is not limited thereto. For example, the calculation unit 103 may receive the information required for the determination above from the ECU controlling the car navigation, for example, and make the determination based on the received information.

In the present embodiment, if the own vehicle cannot pass through the nearest traffic light 30, the electric power control unit 104 controls the electric power state of the own vehicle that is running to be the minimum electric power state allowing the own vehicle to run to the nearest traffic light 30.

Figure 11:
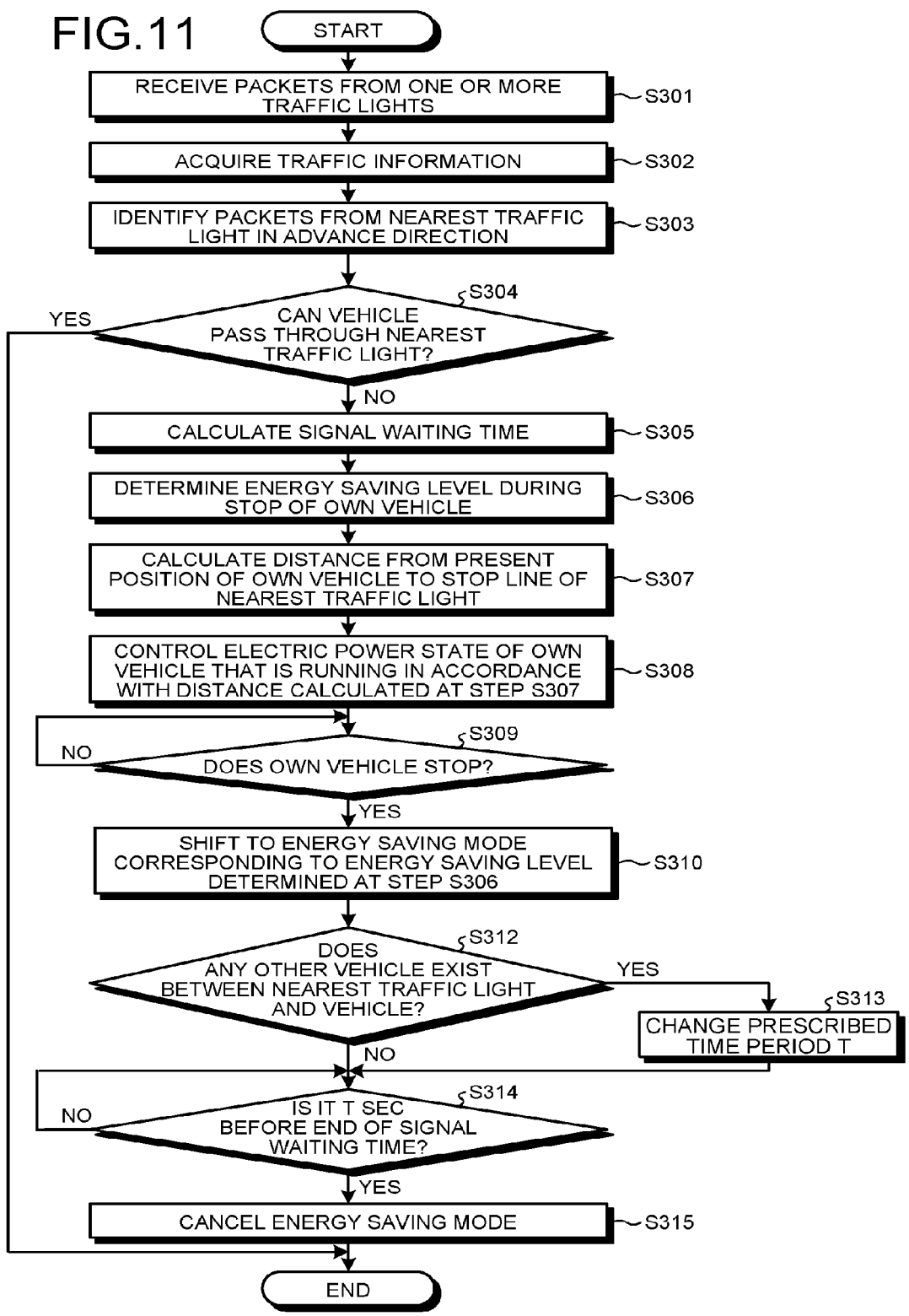
FIG. 11 is a flowchart illustrating an example of operations of the communication apparatus according to the modification of the second embodiment.

FIG. 11 is a flowchart illustrating an example of the operations of the communication apparatus 10 according to the modification of the second embodiment. Details of the process at Step S301 illustrated in FIG. 11 are the same as those of the process at Step S201 illustrated in FIG. 9. In this example, the second acquiring unit 105 acquires the above-described traffic information (Step S302) at the same time as Step S301 illustrated in FIG. 10. However, the configuration is not limited thereto. For example, the second acquiring unit 105 may request traffic information from an external system such as the ITS by using the reception of a packet at Step S301 as a trigger, and acquire the traffic information from the external system.

Details of the process at Step S303 is the same as those of the process at Step S202 illustrated in FIG. 9. After Step S303, the calculation unit 103 determines whether the own vehicle can pass through the nearest traffic light 30 by using the traffic information acquired at Step S302 and the packets transmitted from the nearest traffic light 30 identified at Step S303 (Step S304). As described above, in this example, the calculation unit 103 instructs the ECU controlling the car navigation to determine whether the own vehicle can pass through the nearest traffic light 30. The ECU that has received this instruction determines whether the own vehicle can pass through the nearest traffic light 30 by comparing the predicted time of arrive included in the traffic information with the start time and the end time of the red signal included in the packets transmitted from the nearest traffic light 30, and passes the determination result to the calculation unit 103. If the ECU determines that the own vehicle can pass through the nearest traffic light 30 (Yes at Step S304), the process sequence ends. By contrast, if the ECU determines that the own vehicle cannot pass through the nearest traffic light 30 (No at Step S304), the process sequence proceeds to Step S305. Details of the process from Steps S305 to S315 illustrated in FIG. 11 are the same as those of the process from Steps S204 to S213 illustrated in FIG. 9, and the detailed description thereof is omitted.

Third Embodiment

Figure 12:
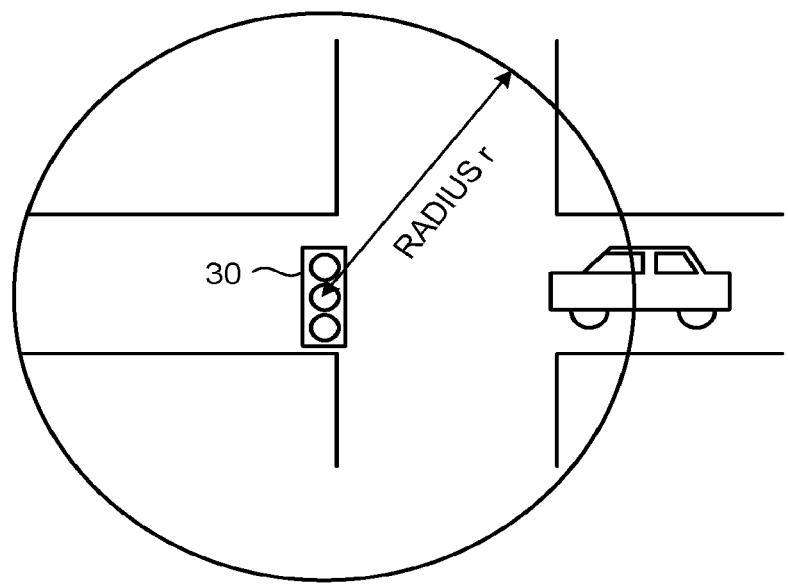
FIG. 12 is a diagram for explaining a method for acquiring packets according to a third embodiment of the present invention.

A third embodiment will now be described. Overlapped explanation with the description in the first embodiment will be omitted as appropriate. The configuration of the ECUs in the own vehicle in the present embodiment is the same as that in the first embodiment. However, in the present embodiment, as illustrated in FIG. 12, the first acquiring unit 102 acquires only the traffic light information (the packets) transmitted from the traffic light 30 whose distance to the own vehicle is equal to or smaller than a reference value (a radius r in the example illustrated in FIG. 12). If the distance between the own vehicle and the traffic light 30 from which the received packets are transmitted exceeds the radius r, the first acquiring unit 102 discards the received packets.

The value of the above-described radius r may be unique to the vehicle or determined based on the congestion on the road or the legal speed. If the value of the radius r is unique to the vehicle, it can be set by a car mechanic through the OBD port 20 illustrated in FIG. 1 at the factory shipment. If the value of the radius r is determined based on the congestion on the road, an inquiry about the congestion on the road can be referred to the server that controls the traffic information. If the value of the radius r is determined based on the legal speed, the radius r can be determined based on the geographic information (the above-described navigation information) stored in the ECU controlling the car navigation or the like. If the vehicle includes a camera system, for example, the speed sign can be image-processed and the legal speed can be recognized. Alternatively, an inquiry can be referred to the server that controls the traffic information to determine the legal speed.

In the present embodiment, if the first acquiring unit 102 receives the packets from the traffic light 30, the first acquiring unit 102 determines whether the value of the distance between the own vehicle and the traffic light 30 from which the packets are transmitted is equal to or smaller than the radius r determined in advance. If the value of the distance between the own vehicle and the traffic light 30 from which the packets are transmitted exceeds the radius r, the first acquiring unit 102 discards the received packets. For example, the first acquiring unit 102 can instruct the ECU controlling the car navigation to determine whether the value of the distance between the own vehicle and the traffic light 30 from which the packets are transmitted is equal to or smaller than the radius r and receive the result. For example, the first acquiring unit 102 can also receive the information required for the determination above from the ECU controlling the car navigation, and determine whether the value of the distance between the own vehicle and the traffic light 30 from which the packets are transmitted is equal to or smaller than the radius r based on the received information.

As illustrated in FIG. 2, after the communication unit 11 receives packets broadcast from the traffic light 30, the control unit 13 compares the information on the radius r stored in the storage unit 12 with the value of a distance d between the own vehicle and the traffic light 30 from which the packets are transmitted. If the value indicates d>r, the received packets are discarded.

Fourth Embodiment

Figure 13:
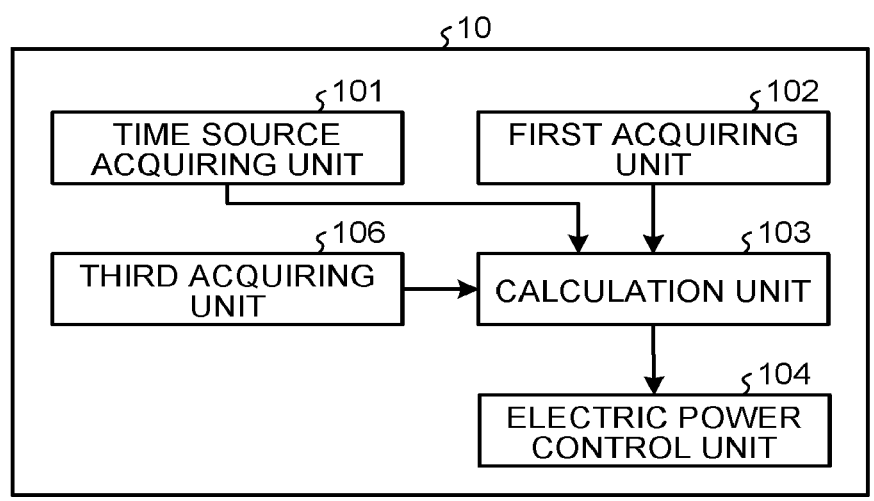
FIG. 13 is a diagram illustrating an example of the functional configuration of a communication apparatus according to a fourth embodiment of the present invention.

A fourth embodiment will now be described. Overlapped explanation with the description in the first embodiment will be omitted as appropriate. FIG. 13 is a diagram illustrating an example of the functional configuration of the communication apparatus 10 according to the fourth embodiment. As illustrated in FIG. 13, the communication apparatus 10 further includes a third acquiring unit 106, which differs from the first embodiment. The third acquiring unit 106 acquires, from another vehicle, the vehicle position information indicating the position of the other vehicle and the stop determination information indicating whether the other vehicle is being stopped.

If the third acquiring unit 106 acquires the stop determination information indicating that the other vehicle (referred to as "second vehicle") nearest to the own vehicle is being stopped from the second vehicle out of one or more other vehicles existing in the advance direction of the vehicle (own vehicle), the calculation unit 103 calculates the signal waiting time by using second predicted time of arrival indicating predicted time for the own vehicle to arrive at the second vehicle and the traffic light information acquired from the nearest traffic light 30. The flowchart illustrating an example of operations of the communication apparatus 10 according to the present embodiment is basically the same as the flowchart illustrated in FIG. 8.

Figure 14:
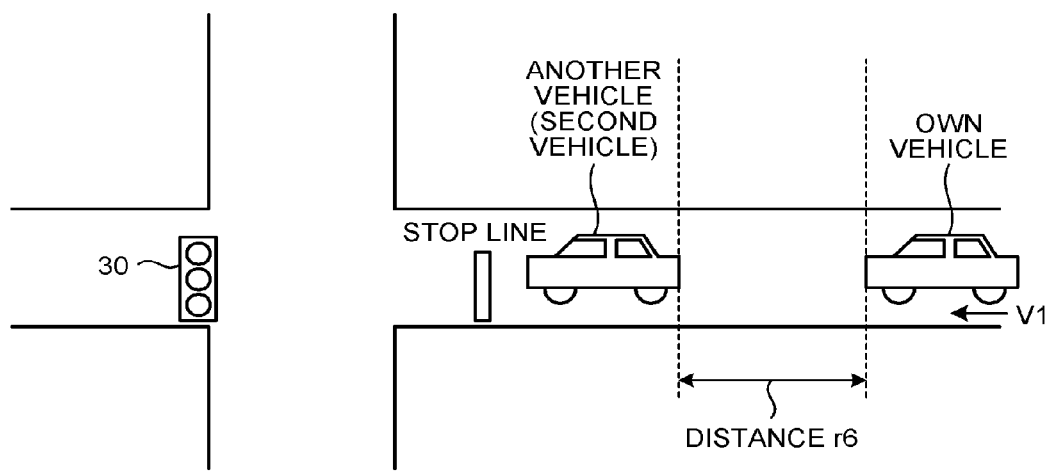
FIG. 14 is a diagram for explaining a calculation method of second predicted time of arrival.

For example, as illustrated in FIG. 14, suppose the own vehicle (the third acquiring unit 106) acquires the stop determination information indicating that the second vehicle is being stopped from the second vehicle being stopped at the nearest traffic light 30. On this occasion, the calculation unit 103 calculates a distance r6 from the present position of the own vehicle to the second vehicle by using the vehicle position information of the second vehicle acquired by the third acquiring unit 106. For example, the calculation unit 103 can calculate the distance r6 based on the vehicle position information acquired by the second vehicle and the above-described navigation information. Subsequently, the calculation unit 103 divides the distance r6 by the speed v1 of the own vehicle (r6/v1) and adds the present time t3 thereto, thereby calculating the second predicted time of arrival (=t3+r6/v1). The calculation unit 103 can therefore calculate the signal waiting time by using the second predicted time of arrival rather than the above-described predicted time of arrival (the calculation method is the same as that in the first embodiment). Other details are the same as those in the first embodiment.

The present invention is not directly limited to the above embodiments. The present invention can be embodied by changing components without departing from the spirit and scope of the present invention when practiced. In addition, various aspects of the present invention can be made by properly combining the components of the above embodiments. For example, some components may be eliminated from all of the components of the above embodiments. Furthermore, the components of different embodiments and modifications may be properly combined with the described component.

In the above-described embodiments, the electric power state during stop of the vehicle is controlled in a multistage manner in accordance with the signal waiting time. However, the configuration is not limited thereto. The electric power state during stop of the vehicle may be controlled in a multistage manner in a different way in accordance with the state of a factor to prevent the vehicle from running (e.g., the above-described waiting for signal).

The computer program executed by the communication apparatus 10 or the ECUs in the vehicle may be provided in a manner recorded as an installable or executable file format on a computer-readable recording medium, such as a compact disc read-only memory (CD-ROM), a flexible disk (FD), a compact disc recordable (CD-R), a digital versatile disc (DVD), and a universal serial bus (USB). Alternatively, the computer program executed by the communication apparatus 10 or the ECUs in the vehicle may be provided or distributed over a network such as the Internet. Furthermore, various computer programs may also be provided in a manner embedded in advance in a non-volatile recording medium, such as a read only memory (ROM).

An embodiment achieves appropriate energy saving operation in accordance with the signal waiting time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus mounted on a vehicle,
the information processing apparatus comprising:
processing circuitry that
acquires traffic light information from a nearest traffic light at which the vehicle will arrive, the traffic light information including a color of the traffic signal, which indicates that the vehicle should stop;
calculates a signal waiting time that indicates a time period for the vehicle to stop at the nearest traffic light, based on the traffic light information;
determines, based on a length of the signal waiting time, an energy saving mode from among a plurality of energy saving modes; and
controls an electric power of the vehicle when the vehicle is stopped, in accordance with the determined energy saving mode.

2. The information processing apparatus according to claim 1, wherein the processing circuitry further performs control such that power consumption when the vehicle is stopped decreases with an increase in the signal waiting time.

3. The information processing apparatus according to claim 2, wherein when the signal waiting time exceeds a first threshold and is equal to or smaller than a second threshold that is larger than the first threshold, the processing circuitry determines a first energy saving mode and controls an idling speed of an engine to a speed lower than an idling speed of when the signal waiting time is equal to or smaller than the first threshold, and when the signal waiting time exceeds the second threshold, the processing circuitry determines a second energy saving mode and controls the engine to stop.

4. The information processing apparatus according to claim 2, wherein the processing circuitry performs control such that an amount of light of an illumination device provided to the vehicle decreases with an increase in the signal waiting time.

5. The information processing apparatus according to claim 1, wherein the processing circuitry controls an electric power state of the vehicle when running in accordance with a distance that the vehicle will travel before the vehicle stops at the traffic light.

6. The information processing apparatus according to claim 1, wherein the processing circuitry calculates the signal waiting time by using a predicted time of arrival indicating a predicted time for the vehicle to arrive at a nearest traffic light and the traffic light information acquired from the nearest traffic light.

7. The information processing apparatus according to claim 1, wherein the processing circuitry further
acquires traffic information including a predicted time of arrival indicating a predicted time for the vehicle to arrive at the nearest traffic light,
determines whether the vehicle is capable of passing through the nearest traffic light by using one or more pieces of the acquired traffic light information and the acquired traffic information acquired, and
when the vehicle is not capable of passing through the nearest traffic light, controls an electric power state of the vehicle when running so as to be a minimum electric power state allowing the vehicle to arrive at the nearest traffic light.

8. The information processing apparatus according to claim 1, wherein the processing circuitry identifies the nearest traffic light existing in an advance direction of the vehicle based on navigation information indicating position information of the corresponding traffic light and identifying information on each of a plurality of traffic lights, and the advance direction of the vehicle, and calculates the signal waiting time by using the traffic light information including the identifying information on the identified traffic light out of one or more pieces of the acquired traffic light information.

9. The information processing apparatus according to claim 1, wherein the processing circuitry acquires only traffic light information that is transmitted from a traffic light whose distance to the vehicle is equal to or smaller than a reference value.

10. The information processing apparatus according to claim 1, wherein the processing circuitry further
acquires, from another vehicle, vehicle position information indicating a position of the other vehicle, and stop determination information indicating whether the other vehicle is being stopped, and
when acquiring, from the second vehicle, the stop determination information indicating that a second vehicle is being stopped, the second vehicle being nearest to the vehicle out of one or more other vehicles existing in an advance direction of the vehicle, calculates the signal waiting time by using a second predicted time of arrival indicating a predicted time for the vehicle to arrive at the second vehicle and the traffic light information acquired from the nearest traffic light.

11. The information processing apparatus according to claim 1, wherein
an electric power state when the vehicle is stopped is determined by the determined energy saving mode, which has smaller power consumption than a normal mode indicating an electric power state while the vehicle is running, and
when no vehicle exists between the nearest traffic light and the vehicle when the vehicle is stopped, the processing circuitry performs control so as to cancel the determined energy saving mode a prescribed time period before ending of the signal waiting time.

12. The information processing apparatus according to claim 11, wherein the prescribed time period indicates a time period required for the vehicle to return from the determined energy saving mode to the normal mode.

13. The information processing apparatus according to claim 11, wherein when any other vehicle exists between the nearest traffic light and the vehicle when the vehicle is stopped, the processing circuitry changes the prescribed time period depending on a number of other vehicles.

14. The information processing apparatus according to claim 13, wherein when any other vehicle exists between the nearest traffic light and the vehicle when the vehicle is stopped, the processing circuitry changes the prescribed time period such that the prescribed time period decreases with an increase in the number of the other vehicles.

15. The information processing apparatus according to claim 11, wherein when any other vehicle exists between the nearest traffic light and the vehicle when the vehicle is stopped, the processing circuitry performs control to cancel the determined energy saving mode according to a timing at which a third vehicle starts running, the third vehicle being nearest to the vehicle out of the other vehicles existing between the nearest traffic light and the vehicle.

16. An information processing method executed by an information processing apparatus mounted on a vehicle, the information processing method comprising:
first acquiring, from a nearest traffic light at which the vehicle will arrive, traffic light information, the traffic light information including a color of the traffic signal, which indicates that the vehicle should stop;
calculating a signal waiting time that indicates a time period for the vehicle to stop at the nearest traffic light, based on the traffic light information;
determining, based on a length of the signal waiting time, an energy saving mode from among a plurality of energy saving modes; and
controlling an electric power of the vehicle when the vehicle is stopped in accordance with the determined energy saving mode.

17. A computer program product comprising a non-transitory computer-readable medium containing an information processing program, the program causing a computer mounted on a vehicle to execute:
acquiring, from a nearest traffic light at which the vehicle will arrive, traffic light information, the traffic light information including a color of the traffic signal, which indicates that the vehicle should stop;
calculating a signal waiting time that indicates a time period for the vehicle to stop at the nearest traffic light, based on the traffic light information;
determining, based on a length of the signal waiting time, an energy saving mode from among a plurality of energy saving modes; and
controlling an electric power of the vehicle when the vehicle is stopped in accordance with determined energy saving mode.

\* \* \* \* \*